Sept. 3, 1963    O. S. HAMMER    3,102,448
FILM GATE AND ASSOCIATED FRONT END ASSEMBLY OF CAMERA
Filed Jan. 29, 1960

INVENTOR.
OLIVER S. HAMMER
BY Arthur J. Robert
ATTORNEY

United States Patent Office 3,102,448
Patented Sept. 3, 1963

3,102,448
FILM GATE AND ASSOCIATED FRONT END
ASSEMBLY OF CAMERA
Oliver S. Hammer, New Albany, Ind., assignor to United
Electronics Laboratories, Inc., Louisville, Ky., a corporation of Kentucky
Filed Jan. 29, 1960, Ser. No. 5,514
4 Claims. (Cl. 88—17)

This invention relates to improvements in cameras for taking sequential photographs of the type shown in my copending U.S. application, Ser. No. 835,246, filed August 21, 1959, now Patent No. 3,011,416.

My prior application points out that sequence cameras are useful in various applications including commercial, industrial and medical; that, in banks, stores and other establishments, the use of a sequence camera may deter the commission of crimes such as robbery, shop-lifting, vandalism, etc., and assist in the identification of the perpetrators thereof; in stores, factories and other places, it is useful in recording the activities of sales persons and workers, the flow of materials and the operation of machines and equipment; and in medical clinics and wards, it is useful for recording behavior and other data useful in making clinical and psychiatric ward analyses.

For a sequence camera to be satisfactory for the above uses, it should consistently take good photographs; anything less than 100% efficient photography cannot be tolerated for usually only a few of the many photographs taken are important and any poor photographs, even though they be only a small percentage of the total, may be the very ones which are important. These photographs should be of such excellence that they can be greatly enlarged (blown up) to show small details clearly. Hence, it is important that the photographs be accurately focused and properly framed on the film at all times, that the film not be scratched by the camera mechanism and that any light leakage be avoided. It is also important that a sequence camera be reasonably economical to manufacture in order to be available and practical for the above use.

The principal object of this invention is substantially to meet these requirements and to provide an improved sequence camera structure.

More specifically, an important object of the present invention, in connection with the taking of sequential photographs at controlled intervals, is to provide a camera which is of simple and sturdy design capable of being easily and inexpensively manufactured, which can be easily and quickly installed, loaded and unloaded, which will consistently center the operative frames of each successive film properly and maintain them in exact focus without scratching or otherwise damaging the film or subjecting it to undesirable light leaks and which will operate over a long period of time in a trouble-free manner consistently taking good photographs without requiring attention.

Other objects of this invention are: to provide a sequence camera construction which can be economically manufactured of molded or cast parts; to simplify and reduce the number of machining operations ordinarily required in manufacturing a camera of this type; and to provide a sequence camera which can be accurately assembled easily and quickly.

Still another object of this invention is to provide a film gate for a sequence camera which supports the film at an exact predetermined spacing from the camera lens at all times, for maintaining the film in proper focus; which properly frames the photographs on the film consistently; which is simple and easy to open for threading film through it; which does not scratch or otherwise mar the film; and which can be readily and economically made of molded materials such as modern plastics.

Certain of these objects are achieved by providing the camera with a film gate assembly which is separate from the camera frame and has a film seat adapted to engage and guide the film vertically over a rectangular photograph framing aperture provided in the seat and a film pressure plate for lightly but adequately pressing the film against the seat. By guiding and accurately holding the film in a predetermined vertical path, both with respect to front and back movement and transverse movement of the film, it remains in proper focus relative to the camera lens and stays properly positioned over the photograph framing aperture as it moves through the film gate. Providing the rectangular photograph framing aperture in the molded or cast film gate avoids the need for accurately machining the corresponding aperture in the camera frame. Such a film gate can be and preferably is made of a molded or cast material such as one of the modern plastics which does not scratch the film as it travels through the film gate. In addition to these advantages, the presser plate of the disclosed film gate is tiltable about a vertical axis on the film seat to open the gate, for allowing the film to be threaded through the gate, and this is simply and effectively accomplished by pinching the accessible vertical side margin of the presser plate forwardly against the film seat.

Other objects are accomplished by substantially reducing the number and the complexity of the machining operations necessary in manufacturing the camera. These have been reduced to a few relatively simple operations wherein flat surfaces are leveled and reduced to a predetermined thickness.

The accompanying drawing illustrates the invention wherein.

Figure 1:
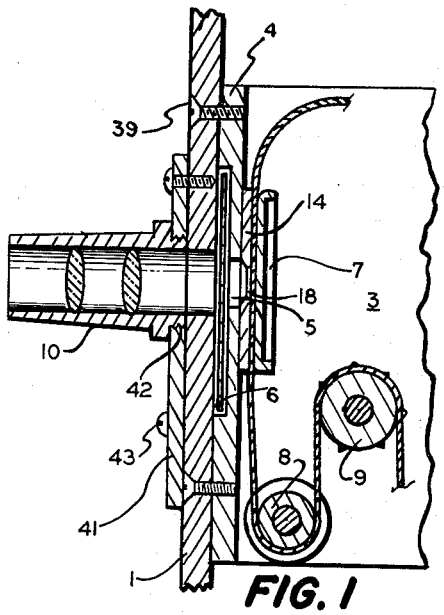
FIG. 1 is a fragmentary section taken along a vertical plane extending centrally through the front of the camera and its lens.
Figure 2:
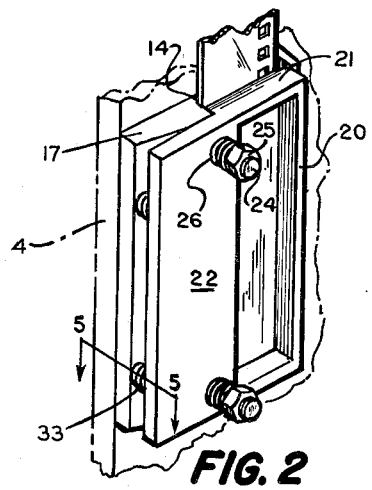
FIG. 2 is an enlarged perspective view of the film gate shown in FIG. 1.

The camera structure shown in FIG. 1 of the drawing generally includes: the front wall 1 of a camera case containing a front wall aperture 2; a camera frame 3 having a base 4 mounted on the inside of said front wall 1 and containing a base aperture 5 aligned with said front wall aperture 2; a shutter 6 disposed between said front wall and base apertures for controlling light passing through said apertures; film handling means mounted on said frame and including a film gate 7 mounted on the rear side of said base over said base aperture, an idler pulley 8 and a film pull-down sprocket 9 for pulling film through said film gate 7; and a lens mount 10 mounted on the outside of said front wall 1 over said case aperture. The above structure is shown and specifically described, along with other camera structure, in my previously mentioned co-pending application Serial No. 835,246.

Improvements shown in the drawing include: a novel film gate; and a novel assembly of the film gate, frame base, case front wall, and lens mount.

FILM GATE

The novel film gate 7 shown in the drawing includes: a film seat for receiving and guiding film over the photographing apertures; a presser plate for pressing the film against the film seat; means connecting said film seat and presser plate together; means for tilting said presser plate on said film seat for opening said film gate; and means for biasing said film seat and presser plate together on a film web.

Film Seat

The film seat 14 is a vertically elongate channel-like member providing a vertically-extending rearwardly-open channel space 15. This channel space 15 is offset relative to the vertical center or axis of the film seat 14 and serves as a vertical guide path for a film web to feed over the film seat. Looking at the film seat in horizontal section, it includes a relatively thin bight, also designated 14, and a pair of legs 16 and 17 extending rearwardly from the opposite side edges of the bight 14, one leg 16 being relatively thin and the other leg 17 being much thicker. The film seat is mounted by anchoring this thicker leg or portion 17 to the base 4 of the camera frame 3.

Figure 6:
FIG. 6 is a fragmentary view of the film gate showing the framing aperture.

A rectangular photograph framing aperture 18 is centrally provided in the bight 14. This aperture 18 is aligned with the case front wall and base apertures 2 and 5 in the mounted position of the film gate. The peripheral edges forming the framing aperture 18 may be beveled on the front side as shown in FIGS. 1 and 6 to reduce the thickness of the edges of the framing aperture. Preferably, the film seat is composed of a black non-reflecting molded plastic.

Presser Plate

The presser plate 20 rests on the rear of the film seat 14 and has a vertically elongate shoe 21 fitting in and substantially filling the channel space 15. The front face of the shoe 21 is adapted to engage the rear face of the film and press it against the film seat bight 14. Hence, the shoe 21 is smooth and curved rearwardly at both its upper and lower ends to avoid scratching or otherwise marring the film. This construction enables the use of an idler sprocket, at the upper end of the gate, to be eliminated. The presser plate 20 is mounted by the tongue or portion 22 which extends from one side of the shoe 21. The presser plate 20 is normally composed of the same material as the film seat 14.

Connection Means

The film seat 14 and presser plate 20 are connected together by a pair of bolts 24 extending rearwardly through the thick leg or portion 17 of the film seat and the tongue portion 22 of the presser plate. Nuts 25 are threaded on the rear ends of the bolts 24 and respective compression springs 26 are interposed on the bolts 24 between the presser plate 20 and the nuts 25 for biasing the presser plate forwardly against the film seat 14.

Tilting Means

Figure 3:
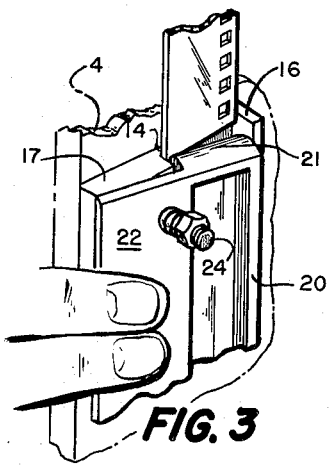
FIG. 3 is similar to FIG. 2 with the film gate being opened for accommodating the threading of film through it.
Figure 5:
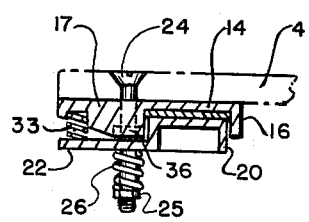
FIG. 5 is a section taken on line 5—5 of FIG. 2.

To tilt the presser plate 20 on the film seat 14, the vertically extending rear edge portion, of the thick leg 17 of the film seat 14, is chamfered to provide a bevel 28. The bevel 28 meets the flat rear face 29 of the film seat portion 17 along a vertical line or axis designated 30 which serves as a fulcrum about which the presser plate 20 tilts in opening and closing the film gate. This construction enables the presser plate 20 to be tilted to an open position about the fulcrum 30 simply by pinching the portions 17 and 22 together along their outer vertical edges, as shown in FIG. 3. In FIG. 5, plate 22 and fulcrum line 30 are shown spaced from each other by a distance approximating the film thickness.

Gate Biasing Means

As the bolts 24 are disposed in the portion 17 between the fulcrum 30 and the channel space 15, the springs 26 on these bolts act to bias the pressure plate 20 about the fulcrum 30 to close the film gate. The tension on the springs 26 is readily adjusted by turning the nuts 25.

In addition, another pair of compression springs 33 are disposed between the portions 17 and 22 on the other side of the fulcrum 30 from the bolts 24 and channel space 15. These latter springs 33 seat in the recesses 34 formed in the bevel 28 of the film seat 14 and are weaker than the springs 26. The springs 33 cooperate with the springs 26 to provide a turning force (turning couple) which swings and biases the presser plate shoe 21 into the channel space 15. The importance of both pairs of springs 26 and 33 is seen when one recognizes the need for keeping the presser plate shoe 21 pressed against the film across substantially all of its width with a substantially uniform pressure. This result is readily achieved with my arrangement of two pairs of springs, whereas it would not normally be attained by using only one pair of springs. The tension on the springs 26 need only be adjusted, by turning the nuts 25, until reaching the point where the forces created by the springs 26 and 33 result in a uniform pressure across the width of the shoe.

ASSEMBLY

This assembly includes: means mounting the film gate on the frame base; means mounting the frame base on the case front wall; and means mounting the lens mount on the case.

Film Gate Mounting Means

Figure 4:
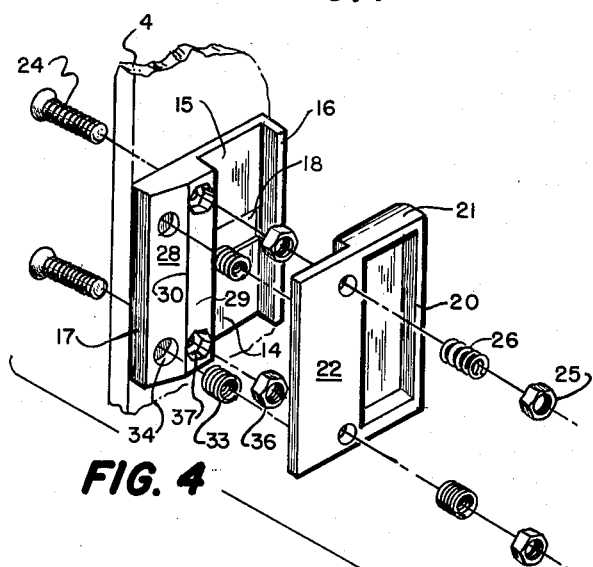
FIG. 4 is an exploded perspective view of the film gate.

The film gate 7 is mounted on the frame base 4 by the same bolts 24 that hold the film seat 14 and pressure plate 20 together. The front face of the film seat 14 rests on the rear face of the frame base 4 with the base aperture 5 aligned with the photograph framing aperture 18 in the film seat 14, the bolts 24 extend rearwardly through appropriate holes in the base 4. As seen in FIG. 4, nuts 36 are threaded over the rear ends of the bolts 24 and screwed down tightly against the rear side of the film seat 14 to clamp the seat against the base. Appropriate recesses 37 are formed in the rear face 29 of the film seat 14 to receive the nuts 36 and offset them inwardly from the plane of the rear face 29. The recesses 37 also lock the nuts 36 against turning. Of course, the film seat 14 is mounted on the frame base 4 before the pressure plate 20 is mounted on the film seat 14.

Frame Base Mounting Means

Both the front and rear faces of the frame base 4 are machined to level them and give the base a predetermined thickness. The inner face of the case front wall 1 is also machined to give the front wall a predetermined thickness. These are the only machining operations performed in preparing the film gate, frame base, case and lens mount for assembly together. The frame base 4 is simply attached to the case front wall 1 by the two screws 39 shown in FIG. 1. By machining both the front wall 1 of the case and the frame base 4, to a predetermined thickness, these parts fit tightly together and have a combined thickness of predetermined order.

Lens Mounting Means

An escutcheon plate 41 of a predetermined thickness and having an appropriate internally threaded hole 42 therein is attached on the outside of the case front wall 1 with its hole 42 aligned with the case aperture 2. This attachment is accomplished simply by several screws 43 extending through the escutcheon plate and threaded into the front wall 1. Since the escutcheon plate 41, the case front wall 1 and the frame base 4 are all of a predetermined thickness, once the lens mount 10 is attached to the escutcheon plate 41 by screwing the mount into the internally threaded hole 42 until the shoulder of the mount fits tightly against the escutcheon plate, the lens mount 10 will be at a precise predetermined distance from the film supported in the film gate 7. The plate-engaging surface of the shoulder of the mount is spaced a fixed predetermined distance from the film in all standard lens mounts, regardless of focal length; hence it provides a fixed reference point which insures proper focus.

SUMMARY

It will be understood, from the foregoing: that the front wall of case 1 and the base 4 of frame 3 are machined on either or both the front and rear sides, as may be necessary, to provide them with an accurately predetermined thickness and flatness; and that the film seat 14 is molded or cast to an accurate thickness between its front and rear sides and a desired degree of flatness on both sides. The plate 41 may be a metal plate manufactured to a predetermined thickness and surface flatness. As a result, the distance from the exposed face of the film to the plate abutting shoulder of the lens mount 10 can be accurately predetermined.

Since the front wall of case 1, the base 4 of frame 3 and the film seat 14 of the gate 7 are of accurate thickness and of requisite flatness, it becomes easy to locate with accuracy the screw holes, by which they are assembled in a fixed relationship to each other; hence, it is correspondingly easy to center the framing aperture 18 accurately with respect to the axis of the lens mount 10.

Furthermore, it is easy to center each successive frame of the film both transversely and longitudinally with respect to the framing aperture 18. Transverse centering is accomplished by means of the legs 16, 17 which engage the side edges of the film to guide that film accurately through the seat 14. Longitudinal centering is secured by conventionally adjusting the angular position of the take-up sprocket 9 relative to the film drive mechanism. An advantage of my foregoing arrangement arises from the fact that, with respect to all light transmitting apertures on the rear side of the bore of the lens mount 10, the framing aperture 18, which is smaller than the bore of the lens mount 10, is the only aperture, which needs to be of an accurately predetermined size, so long as the other intervening apertures are larger. This makes it possible to eliminate any machining of these "larger" apertures, including those which heretofore have had to be machined accurately at substantial expense.

The sensitized space of each frame of a 16 mm. film approximates 17/60 by 38/60. The standard picture taken in that space approximates 17/60 by 23/60. I have found it possible to enlarge my framing aperture 18 to take a picture which approximates 17/60 by 38/60 instead of 23/60. This has the advantage of enabling a given camera, having a lens of given focal length, to photograph a correspondingly larger area without reducing the scale of the objects photographed. It will be understood, of course, that, while a larger area may be photographed on the same camera and the same film with a wider angled lens, the scale of the objects photographed is correspondingly reduced in such case.

My novel film gate can be considered as containing the following structure: a stationary front plate-like member and a relatively movable rear presser plate normally arranged in stationary face-to-face relationship to provide, in cooperation with each other, a fulcrum section interposed between film and tilting sections, the adjacent faces of the front member and of the rear plate providing surfaces in the fulcrum section which extend along a common longitudinally-extending axis that is spaced laterally from both longitudinal edges of the gate, surfaces in the film section which cooperate to provide between the fulcrum section and one longitudinal edge of the gate an open-ended slot-like film passageway extending longitudinally through the gate, and surfaces in the tilting section which are separated to form a tilting space which enables the pressure plate to be rocked about the longitudinal axis of the fulcrum section; means along the fulcrum section securing the presser plate yieldably to the front member for relative rocking movement about said common longitudinal axis and for relative back and forth translation movement, said means including a stem extending transversely through the fulcrum section and projecting from one of the front and rear faces of the gate and first yieldable means associated with said projecting stem to urge the front member and rear plate of the gate yieldably together; and second yieldable means disposed along the tilting space to urge the front member and rear plate rockably toward an operative position in which they are spaced apart in the tilting section and brought together in the film section.

My lens-gate structure inherently provides a fixed predetermined distance between the film and the fixed reference point of a standard lens mount and thus insures an accurate focus with any of a variety of standard lens mounts. This lens-gate structure may be viewed as comprising: a plate-like assembly; an outside lens mount 10; and an inside film gate 7.

The plate-like assembly includes a camera case member 1 having a front wall interposed between a front escutcheon plate member 41 and a rear camera-frame member 4. Each member of this plate-like assembly contains a light-transmitting aperture, such as aperture 2 in the case member 1. Each presents, on its front and rear faces, flat-faced front and rear seating surfaces separated by a predetermined thickness. These members are collectively arranged in rear-face to front-face relationship proceeding from the front rearwardly. They are rigidly secured together with all of their light apertures aligned and with the seating surfaces on their adjacent faces in flush face-to-face engagement so that front and rear faces of the assembly, as a whole, are separated by a predetermined thickness.

The outside lens mount 10 is positioned on the front side of the plate-like assembly and secured to the front escutcheon plate 41 to project forwardly therefrom in alignment with all of said light apertures. It has a rear seating surface which is in face-to-face engagement with the front seating surface of the front plate 41 and which provides a fixed reference point for proper lens-focusing purposes since it is spaced a fixed distance from the film.

The inside film gate 7 is positioned on the rear side of said plate-like assembly and secured to the rear frame 4. It has a front face aperture 18 aligned with said other apertures. It provides a passageway for the passage of a film across its aperture 18 for film-frame exposing purposes. It also has a front seating surface in flush face-to-face engagement with the rear seating surface of said rear frame 4 and is operative to hold a film frame during exposure at a predetermined distance from its front seating surface and thereby hold said film frame at a fixed distance from said fixed reference point on the lens mount.

Having described my invention, I claim:

1. A lens-gate structure for a sequence camera of the movable film type, comprising:
   A. a plate-like assembly including a camera case member having a front wall interposed between a front escutcheon plate member and a rear camera-frame member,
      (1) each member of said plate-like assembly containing a front-to-rear light-transmitting aperture and being of substantially flat solid plate-like form presenting, on its front and rear faces, flat-faced front and rear seating surfaces separated by a predetermined thickness,
      (2) said members being arranged in rear-face to front-face relationship proceeding from the front rearwardly,
      (3) at least one of the adjacent faces of said camera case and camera-frame members being recessed so that both members cooperate to form a shutter chamber;
   B. means securing the members of said plate-like assembly rigidly together
      (1) with all of said light apertures aligned, and
      (2) with the seating surfaces on their adjacent faces in flush face-to-face engagement so that the front and rear faces of the plate-like assembly as a whole are separated by a predetermined thickness;
   C. an outside lens mount positioned on the front side of said plate-like assembly and secured to said front escutcheon plate to project forwardly therefrom in alignment with all of said light-transmitting apertures,
- (1) said lens mount having a rear seating surface,
  - (a) which is in face-to-face engagement with the front seating surface of said front escutcheon plate and
  - (b) which provides a fixed reference point for proper lens-focusing purposes; and
D. an inside film gate positioned on the rear side of said plate-like assembly and mounted on said rear camera-frame member,
  - (1) said gate being composed of front and rear members with connecting means extending through said front and rear members,
    - (a) said connecting means comprising means for firmly securing said front member against said rear camera-frame member and resilient means pressing said rear member of the gate yieldably against said front member thereof,
  - (2) said gate having laterally-spaced longitudinally-extending edges and providing therebetween a longitudinally-extending open-ended slot-like film passageway for the passage of a film across its aperture for film-frame exposing purposes,
  - (3) the front member of said gate having a front-to-rear light-transmitting aperture aligned with said other apertures and a front seating surface in flush face-to-face engagement with the rear seating surface of said rear camera-frame and being operative, in combination with the rear member of said gate to hold a film frame for exposure purposes at a predetermined distance from its front seating surface and thereby hold said film frame at a fixed distance from said fixed reference point.

2. The lens-gate structure of claim 1 wherein:
A. said front and rear members of said film gate comprise a stationary front plate-like member and a relatively movable rear presser plate normally arranged in stationary face-to-face relationship to provide, in cooperation with each other, a fulcrum section interposed between film and tilting sections,
  - (1) the adjacent faces of the stationary front member and of the movable rear plate providing
    - (a) opposed surfaces in the fulcrum section which extend along a common longitudinally-extending axis that is spaced laterally from both longitudinal edges of the gate,
    - (b) opposed surfaces in the film section which cooperate to provide said longitudinally-extending film passageway between the fulcrum section and one longitudinal edge of the gate, and
    - (c) opposed surfaces in the tilting section which are separated to form a tilting space which enables the presser plate to be rocked about the longitudinal axis of the fulcrum section;
B. said front and rear members of said film gate unit are resiliently connected together along said fulcrum section by said connecting means for relative rocking movement about said common longitudinal axis and for relative back and forth translation movement,
  - (1) said connecting means including
    - (a) a stem extending transversely through the fulcrum section and projecting from one of the front and rear faces of the gate and
    - (b) first yieldable means associated with said projecting stem to urge the front member and rear plate of the gate yieldably together;
C. said film gate is provided with second yieldable means disposed along the tilting space to urge the front member and rear plate rockably toward an operative position in which they are spaced apart in the tilting section and brought together in the film section; and
D. said first and second yieldable means cooperating, in said operative position, to rock said relatively movable rear pressure plate in a direction pressing its film section yieldably forward and thereby cause both the front member and the rear plate to press uniformly into slidable engagement with opposite faces of an interposed film.

3. The lens-gate structure of claim 2 wherein, said film gate:
A. a film seat is formed by a rearwardly opening channel on the rear face of said front gate member along its film passageway, the side walls of said channel engaging and guiding the film along said passageway; and
B. said presser plate has a forwardly projecting flat-faced shoe seating in said channel, said shoe being curved rearwardly from its front face at its opposite ends adjacent the ends of said channel.

4. The lens-gate structure of claim 2 wherein, in said film gate:
A. said stem extends forwardly through and protrudes beyond the front face of said front plate-like member for securing said film gate to said rear camera frame member.

References Cited in the file of this patent

UNITED STATES PATENTS

| | | |
|---|---|---|
| 1,661,743 | Wittle | Mar. 6, 1928 |
| 1,767,847 | Howell | June 24, 1930 |
| 1,933,066 | Merle | Oct. 31, 1933 |
| 1,979,984 | Moomaw | Nov. 6, 1934 |
| 2,003,691 | Lundberg | June 4, 1935 |
| 2,249,228 | Rogers | July 15, 1941 |
| 2,733,062 | De Valle et al. | Jan. 31, 1956 |